US012710003B2

(12) United States Patent
Nakawatase et al.

(10) Patent No.: US 12,710,003 B2
(45) Date of Patent: Aug. 18, 2026

(54) BLOW-BY GAS PROCESSING APPARATUS, INTERNAL COMBUSTION ENGINE, AND SUPERCHARGER

(71) Applicants: TOYOTA JIDOSHA KABUSHIKI KAISHA, Toyota (JP); IHI Corporation, Tokyo (JP)

(72) Inventors: Akira Nakawatase, Toyota (JP); Masashige Takahashi, Tokyo (JP)

(73) Assignees: TOYOTA JIDOSHA KABUSHIKI KAISHA, Toyota (JP); IHI Corporation, Tokyo (JP)

( * ) Notice: Subject to any disclaimer, the term of this patent is extended or adjusted under 35 U.S.C. 154(b) by 35 days.

(21) Appl. No.: 18/984,256

(22) Filed: Dec. 17, 2024

(65) Prior Publication Data

US 2025/0264043 A1 Aug. 21, 2025

(30) Foreign Application Priority Data

Feb. 20, 2024 (JP) ................................ 2024-023662

(51) Int. Cl.
*F01M 13/02* (2006.01)
*F01M 13/04* (2006.01)
*F02B 43/10* (2006.01)

(52) U.S. Cl.
CPC .......... *F01M 13/022* (2013.01); *F01M 13/04* (2013.01); *F02B 43/10* (2013.01); *F01M 2013/027* (2013.01)

(58) Field of Classification Search
CPC ........ B01D 45/00; F01M 11/08; F01M 13/00; F01M 2013/0038; F01M 13/04; F01M 13/0405; F01M 2013/0461
See application file for complete search history.

(56) References Cited

U.S. PATENT DOCUMENTS 5,803,025 A * 9/1998 Feucht .................. F01M 13/04 123/41.86
6,394,078 B1 5/2002 Kling
2006/0045764 A1* 3/2006 Thompson ............ F02M 25/06 417/313

(Continued)

FOREIGN PATENT DOCUMENTS

DE 199 29 876 A1 1/2001
DE 20302824 U1 * 7/2004 ............ F01M 13/04

(Continued)

*Primary Examiner* — George C Jin
*Assistant Examiner* — Teuta B Holbrook
(74) *Attorney, Agent, or Firm* — Finnegan, Henderson, Farabow, Garrett, and Dunner, LLP

(57) ABSTRACT

A blow-by gas processing apparatus includes an intake passage, a blow-by gas passage, and a storage chamber that stores emulsion contained in blow-by gas. The blow-by gas passage includes a separation chamber, an upstream passage through which the blow-by gas passes, and a downstream passage that connects the separation chamber to the intake passage. A facing wall of the separation chamber faces an upstream opening to which the upstream passage is connected. The storage chamber is located downward of the facing wall in a vertical direction. The facing wall is continuous with a defining wall that is a wall for defining the storage chamber.

3 Claims, 3 Drawing Sheets

(56) References Cited

U.S. PATENT DOCUMENTS

| | | | | |
|---|---|---|---|---|
| 2010/0089341 | A1* | 4/2010 | Richardson ............ | F02M 25/10 123/3 |
| 2013/0266436 | A1* | 10/2013 | Ibaraki .................. | F04D 29/685 415/208.1 |
| 2015/0020783 | A1* | 1/2015 | Sadamitsu ........... | F01M 13/022 123/568.11 |
| 2015/0361839 | A1* | 12/2015 | Kimura .................. | F01M 5/002 184/6.5 |
| 2016/0265404 | A1* | 9/2016 | Fujii ...................... | F02M 25/06 |
| 2021/0054810 | A1* | 2/2021 | Jin ...................... | F04D 29/4213 |

FOREIGN PATENT DOCUMENTS

| | | | | | |
|---|---|---|---|---|---|
| FR | 3063304 | A1 | * | 8/2018 | ................ F04F 5/20 |
| JP | 2007-309257 | A | | 11/2007 | |
| JP | 2009-270524 | A | | 11/2009 | |
| JP | 2021-008859 | A | | 1/2021 | |
| KR | 20230130990 | A | * | 9/2023 | ............. F01M 13/04 |

* cited by examiner

BLOW-BY GAS PROCESSING APPARATUS, INTERNAL COMBUSTION ENGINE, AND SUPERCHARGER

CROSS-REFERENCE TO RELATED APPLICATION

This application claims priority to Japanese Patent Application No. 2024-023662 filed on Feb. 20, 2024, incorporated herein by reference in its entirety.

BACKGROUND

1. Technical Field

The present disclosure relates to a blow-by gas processing apparatus, an internal combustion engine, and a supercharger.

2. Description of Related Art

Japanese Unexamined Patent Application Publication No. 2021-008859 discloses a blow-by gas processing apparatus for an internal combustion engine. The blow-by gas processing apparatus mixes blow-by gas in a crankcase with intake air and then combusts the mixture in a combustion chamber of the internal combustion engine.

SUMMARY

In an internal combustion engine equipped with a supercharger, intake air containing blow-by gas is compressed by a compressor wheel of the supercharger and then supplied to a combustion chamber. The blow-by gas contains oil and water produced by the combustion of fuel. When these oil and water are mixed together, emulsion is generated. The emulsion has a higher density than the blow-by gas that does not contain emulsion. Therefore, there is a risk that the compressor wheel may be damaged when the emulsion collides with the compressor wheel.

A blow-by gas processing apparatus for an internal combustion engine for solving the above problem, includes an intake passage in which a compressor wheel of a supercharger is disposed, a blow-by gas passage, and a storage chamber for storing emulsion contained in blow-by gas, wherein the blow-by gas passage includes a separation chamber for separating the emulsion from the blow-by gas, an upstream passage that connects an interior of a crankcase of the internal combustion engine with the separation chamber, and a downstream passage that connects the separation chamber with the intake passage, the separation chamber includes an upstream opening to which the upstream passage is connected, and a facing wall facing the upstream opening, the storage chamber is located downward of the facing wall in a vertical direction, and the facing wall is continuous with a defining wall that defines the storage chamber.

A supercharger for an internal combustion engine for solving the above problem, includes an intake passage, a blow-by gas passage including a separation chamber configured to separate emulsion from blow-by gas, an upstream passage, and a downstream passage, a compressor wheel arranged in the intake passage, and a storage chamber for storing emulsion contained in the blow-by gas, wherein the separation chamber is connected with an interior of a crankcase of the internal combustion engine via the upstream passage and connected with the intake passage via the downstream passage, and includes an upstream opening to which the upstream passage is connected, and a facing wall facing the upstream opening, the storage chamber is located downward of the facing wall in a vertical direction, and the facing wall is continuous with a defining wall that defines the storage chamber.

In the blow-by gas processing apparatus, the internal combustion engine, and the supercharger disclosed in the present disclosure, the compressor wheel is unlikely to be damaged due to impingement of emulsion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of a blow-by gas processing apparatus 1 will be described below with reference to FIG. 1 to FIG. 3. Note that the drawings may show components that are illustrated as being enlarged to facilitate understanding. The dimensional ratios of the components may differ from the actual ones or from those in other drawings. Furthermore, in the following description, upward and downward in a vertical direction may be simply referred to as up and down, respectively. When the relative positions of components in the up-down direction in the vertical direction are described, upper and lower parts of the components may be referred to.

Internal Combustion Engine

The internal combustion engine 2 equipped with this blow-by gas processing apparatus 1 is an internal combustion engine that burns hydrogen as fuel.

Figure 1:
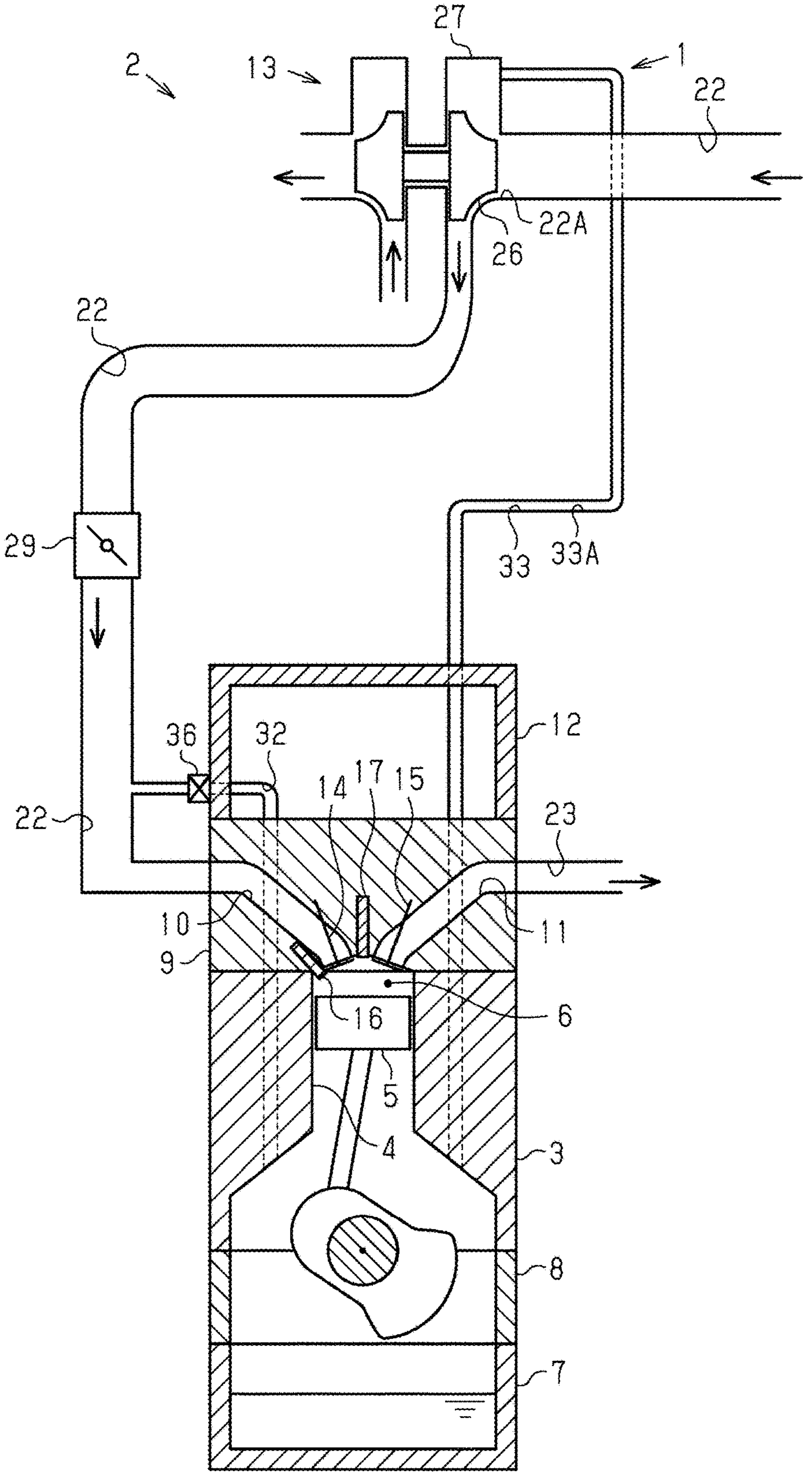
FIG. 1 is a schematic diagram of an internal combustion engine equipped with a blow-by gas processing apparatus.

As shown in FIG. 1, the internal combustion engine 2 includes a cylinder block 3, a crankcase 8 attached to a lower part of the cylinder block 3, and a cylinder head 9 attached to an upper part of the cylinder block 3. The internal combustion engine 2 includes an oil pan 7 attached to a lower part of the crankcase 8, and a head cover 12 attached to an upper part of the cylinder head 9.

The cylinder block 3 has a cylinder 4. The cylinder 4 houses a reciprocating piston 5. The cylinder block 3 and the cylinder head 9 have a combustion chamber 6 in which hydrogen is burned. The combustion chamber 6 is located above a piston 5 in the cylinder 4. Oil is stored in the oil pan 7. The cylinder head 9 has an intake port 10 and an exhaust port 11.

The internal combustion engine 2 includes an intake valve 14 that opens and closes the intake port 10, an exhaust valve 15 that opens and closes the exhaust port 11, a fuel injection valve 16, and an ignition device 17.

The internal combustion engine 2 includes an intake passage 22 connected to the intake port 10, and an exhaust passage 23 connected to the exhaust port 11.

The internal combustion engine 2 includes a supercharger 13. The supercharger 13 includes a compressor wheel 26, and a compressor housing 27 that houses the compressor wheel 26. The intake passage 22 includes a portion provided within the compressor housing 27 (hereinafter, may be referred to as an in-housing intake passage 22A), a portion upstream of the in-housing intake passage 22A, and a portion downstream of the in-housing intake passage 22A. A throttle valve 29 is provided in a portion of the intake passage 22 downstream of the compressor housing 27.

Blow-by Gas Processing Apparatus

As shown in FIG. 1, the blow-by gas processing apparatus 1 includes a ventilation passage 32, a blow-by gas passage 33, and a PCV valve 36. The ventilation passage 32 connects a downstream portion of the throttle valve 29 in the intake passage 22 with the interior of the crankcase 8. The blow-by gas passage 33 connects the in-housing intake passage 22A of the intake passage 22 with the interior of the crankcase 8. The PCV valve 36 is provided in the ventilation passage 32. The PCV valve 36 opens during blow-by gas processing.

Figure 2:
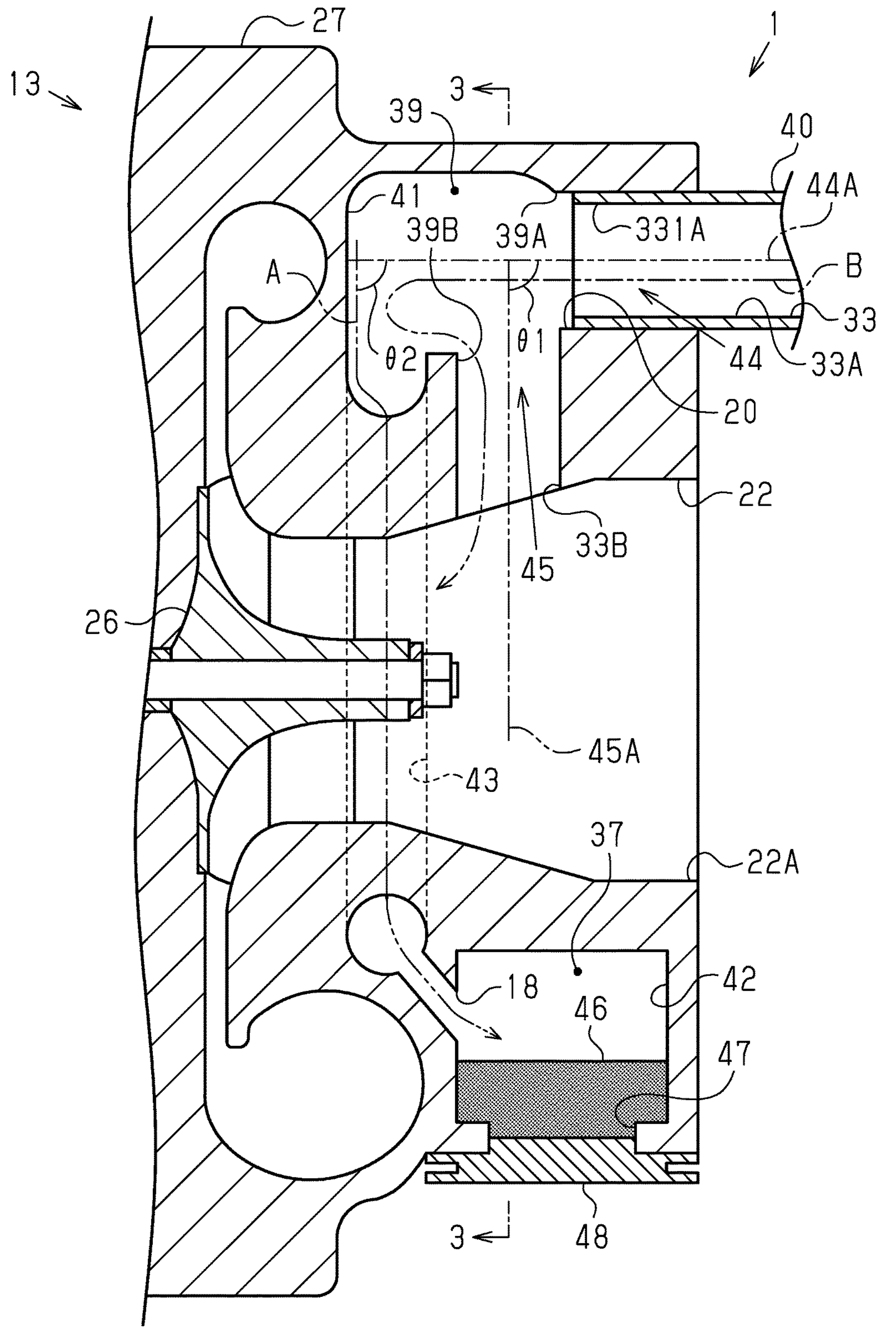
FIG. 2 is a sectional view showing a compressor housing of the internal combustion engine.
Figure 3:
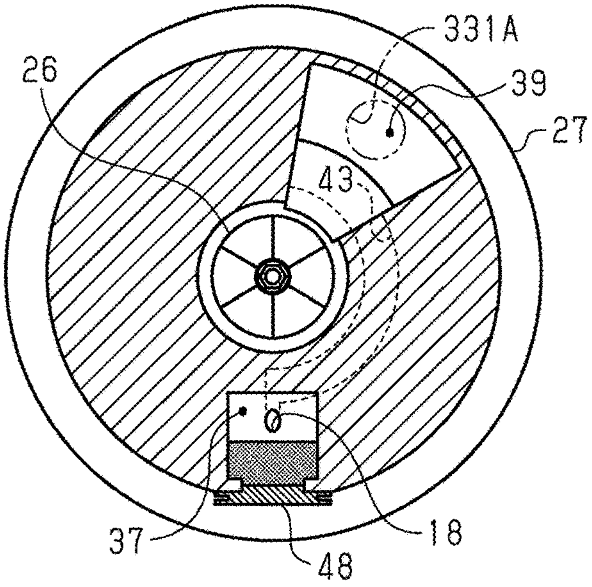
FIG. 3 is a sectional view of the compressor housing taken along line 3-3 in FIG. 2.

As shown in FIG. 1 to FIG. 3, the blow-by gas processing apparatus 1 includes the intake passage 22 and a storage chamber 37 that stores emulsion 46 contained in the blow-by gas. The compressor wheel 26 of the supercharger 13 is disposed in a portion upstream of the throttle valve 29 in the intake passage 22.

Supercharger

The supercharger 13 functions as a part of the blow-by gas processing apparatus 1. The blow-by gas passage 33 includes a separation chamber 39 configured to separate the emulsion 46 from the blow-by gas, an upstream passage 33A, and a downstream passage 33B. The upstream passage 33A includes a portion extending from the crankcase 8 to the compressor housing 27, and a portion provided in the compressor housing 27 (hereinafter, may be referred to as an in-housing gas passage 331A). The in-housing gas passage 331A is a passage defined by the inner wall of a portion inserted into a through-hole 20 in the PCV union 40. The compressor housing 27 has the in-housing gas passage 331A, the downstream passage 33B, and the separation chamber 39. The separation chamber 39 also includes an upstream opening 39A to which the upstream passage 33A is connected, a downstream opening 39B to which the downstream passage 33B is connected, and a facing wall 41 facing the upstream opening 39A. The facing wall 41 is a part of the inner wall of the compressor housing 27.

The compressor housing 27 has a through-hole 20 that connects the outside of the compressor housing 27 to the separation chamber 39. The upstream opening 39A is an opening of the through-hole 20 on the separation chamber 39 side. A PCV union 40 into which blow-by gas flows from the upstream passage 33A flows is inserted into the through-hole 20. The separation chamber 39 is caused to communicate with the interior of the crankcase 8 of the internal combustion engine 2 via the upstream passage 33A, and communicates with the in-housing intake passage 22A via the downstream passage 33B.

The compressor housing 27 has the storage chamber 37. The storage chamber 37 is located at a lower part of the compressor housing 27. The storage chamber 37 is located downward of the facing wall 41. Furthermore, the facing wall 41 is continuous with a defining wall 42 that defines the storage chamber 37. The facing wall 41 and the defining wall 42 being continuous includes a case where the facing wall 41 and the defining wall 42 are directly connected to each other, as well as a case where the facing wall 41 and the defining wall 42 are connected to each other via another wall.

A case where two walls out of the facing wall 41, the defining wall 42, and one or more other walls connecting both the walls 41, 42 are directly connected to each other includes a case where a ridge line or a valley line exists at the boundary portion between the two walls, and a case where a ridge line or a valley line does not exist. In the case where a ridge line or a valley line does not exist at the boundary portion between the two walls, the boundary portion between the two walls is formed by the same flat surface or the same curved surface.

When the facing wall 41 and the defining wall 42 are directly connected to each other, the emulsion 46 flows down along the facing wall 41 toward the defining wall 42. When the facing wall 41 and the defining wall 42 are connected to each other via another wall, the emulsion 46 first flows down along the facing wall 41 toward the other wall, and then flows down along the other wall toward the defining wall 42.

The compressor housing 27 has a communication hole 43 that connects the separation chamber 39 and the storage chamber 37 with each other. The communication hole 43 extends in an arc shape along the circumferential direction of the compressor wheel 26. The storage chamber 37 has an opening 18 to which the communication hole 43 is connected.

In the present embodiment, the defining wall 42 is continuous with the facing wall 41 through the inner wall of the communication hole 43. The inner wall of the communication hole 43 is an example of another wall that connects the facing wall 41 and the defining wall 42 to each other.

The compressor housing 27 has a discharge hole 47 for discharging the emulsion 46 stored in the storage chamber 37 to the outside of the compressor housing 27. The discharge hole 47 is preferably located at a lower part of the compressor housing 27. The discharge hole 47 connects the storage chamber 37 and the outside of the compressor housing 27 with each other. The compressor housing 27 has a lid 48 that blocks the discharge hole 47. The lid 48 is configured to be detachable from the discharge hole 47. In the present embodiment, the discharge hole 47 extends downward from the storage chamber 37. The lid 48 blocks the discharge hole 47 from the outside of the compressor housing 27.

Separation of Blow-by Gas and Emulsion

The oil and water inside the crankcase 8 are mixed with each other inside the crankcase 8. The mixed oil and water flow through the upstream passage 33A together with the blow-by gas. When the oil and the water pass through the upstream passage 33A, they are gradually reduced in temperature, and liquefied. As a result, emulsion 46 occurs in the upstream passage 33A.

The blow-by gas that flows from the upstream opening 39A into the separation chamber 39 impinges against the facing wall 41. Since the emulsion 46 has a higher density than the blow-by gas, the emulsion 46 has a larger inertial force than the blow-by gas that does not contain the emulsion 46. Therefore, when the blow-by gas impinges against the facing wall 41, the emulsion 46 contained in the blow-by gas adheres to the facing wall 41. As a result, the emulsion 46 is separated from the blow-by gas.

As shown in FIG. 2, the emulsion 46 attached to the facing wall 41 gradually drops due to gravity acting on the emulsion 46 and flows into the communication hole 43. The emulsion 46 that has flowed into the communication hole 43 flows down along the inner wall of the communication hole 43, and then flows into the storage chamber 37 from the opening 18.

On the other hand, as indicated by an imaginary line B in FIG. 2, the blow-by gas from which the emulsion 46 has been separated flows from the downstream opening 39B into the downstream passage 33B, and merges with the intake air flowing through the in-housing intake passage 22A.

The greater the difference between the flow direction of the blow-by gas from the upstream opening 39A to the facing wall 41 and the flow direction of the blow-by gas when the blow-by gas impinges against the facing wall 41, passes from the separation chamber 39 through the downstream opening 39B and then flows into the downstream passage 33B, the greater the amount of emulsion 46 that adheres to the facing wall 41. On the other hand, when the difference in the flow direction of the blow-by gas described above becomes large, the pressure loss when the blow-by gas flows increases, so that the amount of blow-by gas flowing into the in-housing intake passage 22A tends to decrease. For this reason, it is desirable to adopt the following configuration.

First, a portion connected to the upstream opening 39A in the upstream passage 33A is referred to as an upstream portion 44, and a portion connected to the downstream opening 39B in the downstream passage 33B is referred to as a downstream portion 45. An imaginary line extending in parallel to an extension direction of the upstream portion 44 is referred to as a first imaginary line 44A. Furthermore, among imaginary lines extending in parallel to the extension direction of the downstream portion 45, an imaginary line that intersects with the first imaginary line 44A is referred to as a second imaginary line 45A.

In this case, it is preferable that an intersection angle θ1 which is the intersection angle between the first imaginary line 44A and the second imaginary line 45A shown in FIG. 2 is 70 degrees or more and 110 degrees or less. Furthermore, it is more preferable that the intersection angle θ1 is 80 degrees or more and 100 degrees or less. In the present embodiment, the intersection angle θ1 is 90 degrees.

In the present embodiment, the facing wall 41 is a flat surface. As the blow-by gas impinges against the facing wall 41 more perpendicularly, the amount of the emulsion 46 adhering to the facing wall 41 is more likely to be large. Therefore, it is preferable that an impingement angle θ2 which is the intersection angle between the first imaginary line 44A shown in FIG. 2 and the facing wall 41 is 70 degrees or more and 110 degrees or less. Furthermore, it is more preferable that the impingement angle θ2 is 80 degrees or more and 100 degrees or less. In the present embodiment, the impingement angle θ2 is 90 degrees.

Actions and Effect of Present Embodiment (1) The blow-by gas that flows into the separation chamber 39 impinges against the facing wall 41. At this time, the emulsion 46 contained in the blow-by gas adheres to the facing wall 41, so that the amount of emulsion 46 that flows from the separation chamber 39 through the downstream passage 33B into the in-housing intake passage 22A is reduced. As a result, damage of the compressor wheel 26 which is caused by the impingement of the emulsion 46 against the compressor wheel 26 is less likely to occur.

(2) The emulsion 46 adhering to the facing wall 41 flows down along the facing wall 41 toward the defining wall 42. The emulsion 46 that has flown down is stored in the storage chamber 37. Since the storage chamber 37 is located downward of the facing wall 41 and the communication hole 43, the emulsion 46 is stored at the lower part of the storage chamber 37. Therefore, the emulsion 46 is unlikely to return to blow-by gas again.

(3) Since the impingement angle θ2 is 90 degrees, that is, the blow-by gas impinges perpendicularly against the facing wall 41, the emulsion 46 is likely to adhere to the facing wall 41. Therefore, the amount of the emulsion 46 separated from the blow-by gas is likely to increase.

(4) The temperature of the compressor housing 27 increases due to heat generated when the compressor wheel 26 compresses air. Therefore, the temperature of the facing wall 41 also increases. As a result, the viscosity of the emulsion 46 adhering to the facing wall 41 decreases. Therefore, the emulsion 46 tends to quickly flow down from the facing wall 41 into the storage chamber 37.

(5) As the temperature of the compressor housing 27 increases, the temperature of the defining wall 42 of the storage chamber 37 also increases similarly to that of the facing wall 41. This reduces the viscosity of the emulsion 46 to be stored in the storage chamber 37. Accordingly, it is easier to discharge the emulsion 46 in the storage chamber 37 to the outside through the discharge hole 47.

(6) The emulsion 46 stored in the storage chamber 37 is discharged to the outside through the discharge hole 47 by detaching the lid 48. In particular, when the discharge hole 47 extends downward from the storage chamber 37, the lid 48 blocks the discharge hole 47 from below in the vertical direction. Therefore, the emulsion 46 in the storage chamber 37 can be efficiently discharged to the outside by detaching the lid 48.

(7) The emulsion 46 adhering to the facing wall 41 flows into the communication hole 43. When the emulsion 46 flows down from the facing wall 41 toward the storage chamber 37, the emulsion 46 is surrounded by the inner wall of the communication hole 43, so that the emulsion is unlikely to scatter to the surroundings.

(8) In an internal combustion engine that burns hydrogen as fuel, the emulsion contained in the blow-by gas tends to increase, for example, as compared with an internal combustion engine that burns gasoline as fuel. This makes it easier for the compressor wheel to be damaged due to the impingement of the emulsion. Therefore, according to the present embodiment, an effect of restraining damage to the compressor wheel 26 is significant.

Modification

The above embodiment can be implemented by altering the configuration as follows. The above embodiment and the following modification can be implemented in combination with each other to the extent that they are not technically inconsistent. Note that the same components as those in the above embodiment are given the same reference signs and duplicative descriptions thereof are omitted.

Figure 4:
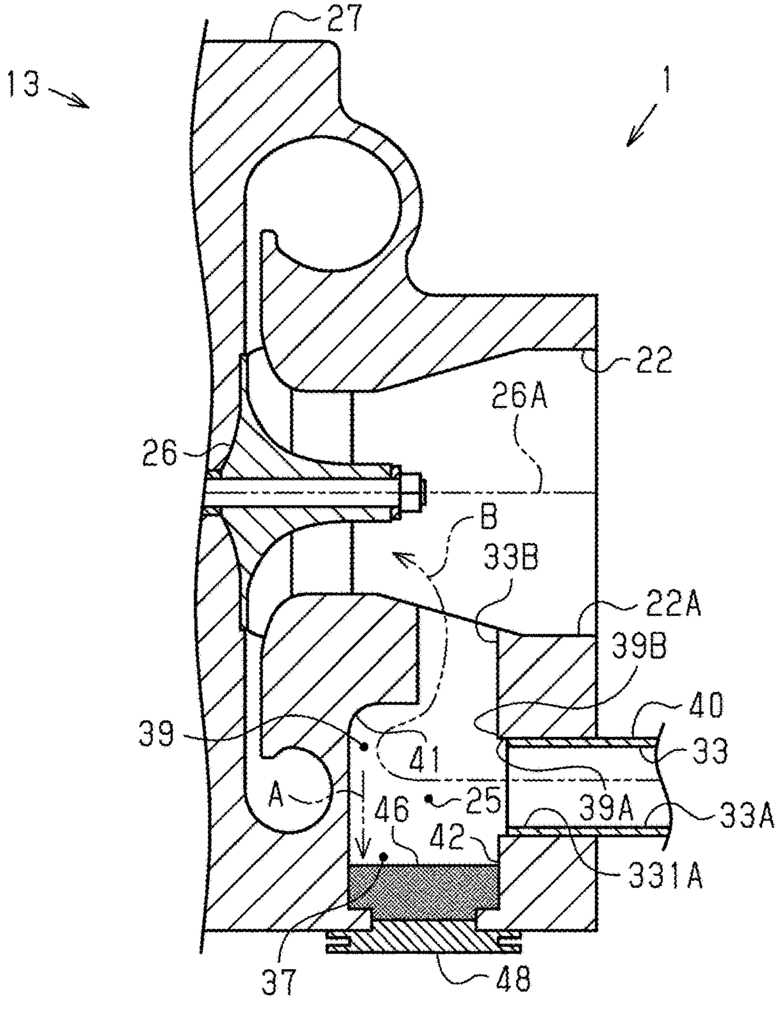
FIG. 4 is a sectional view showing a modification example of the blow-by gas processing apparatus.

In the modification shown in FIG. 4, the compressor housing 27 is provided with one space 25 below a rotation axis 26A of the compressor wheel 26 in the vertical direction. The rotation axis 26A is an imaginary straight line that passes through the rotation center of the compressor wheel 26 and extends along the axis of the compressor wheel 26.

The separation chamber 39 is located at an upper part of the space 25. The storage chamber 37 is located at a lower part of the space 25. The facing wall 41 is continuous with the defining wall 42. In the present modification, the facing wall 41 is directly connected to the defining wall 42.

The facing wall 41 is directly connected to the defining wall 42. Therefore, the emulsion 46 is less likely to scatter to the surroundings when it flows down from the facing wall 41 into the storage chamber 37.

Furthermore, since the storage chamber 37 is located downward of the rotation axis 26A in the vertical direction, the emulsion 46 stored in the storage chamber 37 can be easily discharged quickly to the outside through the discharge hole 47.

At least one of the separation chamber 39, the storage chamber 37, the upstream passage 33A, the downstream passage 33B, and the communication hole 43 may be provided in a portion other than the compressor housing 27 of the supercharger 13, for example, in a turbine housing that accommodates a turbine wheel.

The separation chamber 39 and the storage chamber 37 may both be provided outside the compressor housing 27. In the present modification, the storage chamber 37 is also located below the facing wall 41. Furthermore, the facing wall 41 is continuous with the defining wall 42.

Out of the separation chamber 39 and the storage chamber 37, the storage chamber 37 may be disposed outside the compressor housing 27. In the present modification example, the storage chamber 37 is located below the facing wall 41. The storage chamber 37 is connected to the separation chamber 39 via an external pipe installed outside the compressor housing 27. The external pipe is configured to cause the emulsion 46 separated in the separation chamber 39 to flow into the storage chamber 37. The facing wall 41 is continuous with the defining wall 42 via the inner wall of the external pipe. The inner wall of the external pipe is an example of another wall for connecting the facing wall 41 and the defining wall 42.

The facing wall 41 may have a curved surface. When the facing wall 41 has a curved surface, the impingement angle θ2 described above is an intersection angle between the first imaginary line 44A and a tangent to the curved surface at the intersection point between the first imaginary line 44A and the facing wall 41. When the facing wall 41 has a curved surface, in order to increase the amount of emulsion 46 adhering to the facing wall 41, it is preferable that the curved surface has a shape that is recessed toward the opposite side to the upstream opening 39A rather than a shape that bulges toward the upstream opening 39A.

In the upstream passage 33A, the upstream portion 44, which is a connecting portion with the upstream opening 39A, may be provided with a convex portion such as a partition plate or a protrusion in a state where it has an opening portion through which the blow-by gas flows. By providing the convex portion in the upstream portion 44, a part of the blow-by gas flowing through the upstream passage 33A impinges against the convex portion, so that a part of the emulsion 46 accumulates near the convex portion. This makes it possible to reduce the amount of emulsion 46 flowing into the separation chamber 39, and makes it possible to miniaturize the storage chamber 37.

In the above modification, it is desirable that the convex portion is provided at the lower part of the upstream portion 44 in the vertical direction. The lower part of the upstream portion 44 trends to pass a larger amount of emulsion 46 therethrough in the vertical direction than the upper part of the upstream portion 44. Therefore, the amount of emulsion 46 to accumulate near the convex portion increases. As a result, the present modification can further contribute to the miniaturization of the storage chamber 37.

The internal combustion engine 2 may be an internal combustion engine that burns gasoline as fuel.

What is claimed is:

1. A blow-by gas processing apparatus for an internal combustion engine equipped with a supercharger, comprising:

an intake passage in which a compressor wheel of the supercharger is disposed;

a blow-by gas passage; and a storage chamber for storing emulsion contained in blow-by gas, wherein:

the blow-by gas passage includes a separation chamber for separating the emulsion from the blow-by gas, an upstream passage that connects an interior of a crankcase of the internal combustion engine with the separation chamber, and a downstream passage that connects the separation chamber with the intake passage, the separation chamber includes an upstream opening to which the upstream passage is connected, and a facing wall facing the upstream opening, the storage chamber is located downward of the facing wall in a vertical direction, the facing wall is continuous with a defining wall that defines the storage chamber, a compressor housing that houses the compressor wheel has the separation chamber and the storage chamber, and the compressor housing has a communication hole that connects the separation chamber and the storage chamber with each other, and the communication hole extends in an arc shape along a circumferential direction of the compressor wheel.

2. An internal combustion engine that burns hydrogen as fuel, comprising the blow-by gas processing apparatus according to claim 1.

3. A supercharger for an internal combustion engine, comprising:

an intake passage;

a blow-by gas passage including a separation chamber configured to separate emulsion from blow-by gas, an upstream passage, and a downstream passage;

a compressor wheel arranged in the intake passage; and a storage chamber for storing emulsion contained in the blow-by gas, wherein:

the separation chamber is connected with an interior of a crankcase of the internal combustion engine via the upstream passage, and connected with the intake passage via the downstream passage, and includes an upstream opening to which the upstream passage is connected, and a facing wall facing the upstream opening, the storage chamber is located downward of the facing wall in a vertical direction, the facing wall is continuous with a defining wall that defines the storage chamber, a compressor housing that houses the compressor wheel has a space located downward of a rotation axis of the compressor wheel in a vertical direction, the separation chamber is located at an upper part of the space, the storage chamber is located at a lower part of the space, and the facing wall is directly connected to the defining wall.

* * * * *